Patented July 19, 1938

2,124,321

UNITED STATES PATENT OFFICE 2,124,321

PREPARATION OF ANTISEPTICS FOR INTERNAL USE

Edmond T. Tisza, Yonkers, N. Y., assignor to Pyridium Corporation, a corporation of New York No Drawing. Application July 24, 1936, Serial No. 92,390

11 Claims. (Cl. 260—108)

This invention relates to improvements in preparing antiseptics for internal use, and their preparation particularly relates to preparing a non-toxic antiseptic for the treatment of infections of the urinary tract.

Recently, mandelic acid has been used for the treatment of urinary infections. The dosage necessary to accomplish therapeutic results is, however, so large (for instance, 12 gms. daily) that a physician will resort to the use of it in desperate cases only. Furthermore, it is necessary to administer simultaneously a large amount of ammonium chloride, or other agent, to acidify the urine. Furthermore, the gastric disturbances caused by this treatment makes its use very undesirable.

The object of this invention is, therefore, to make a mandelic acid compound which will produce satisfactory therapeutic results, if administered in relatively small quantities.

Another object of this invention is to increase the bactericidal action of mandelic acid by combining same with hexamethylentetramine, hereafter called shortly methenamine.

Methenamine itself is known as a valuable urinary antiseptic, because it liberates formaldehyde in the acid, or acidified medium, of the urinary tract. Another object of this invention is, therefore, to combine methenamine with mandelic acid, an acid which is eliminated unchanged through the urinary tract, and will be useful for this liberation of formaldehyde.

Methenamine itself shows very little bactericidal action when tested in vitro. However, the methenamine mandelate according to this invention shows a decided bactericidal action when tested by the same method. Further, this bactericidal action is about 3–5 times higher than that of mandelic acid alone.

Generally, the invention comprises reacting methenamine and mandelic acid under such conditions as to produce a compound thereof which will have greater relative activity than either the methenamine or mandelic acid alone, and also greater activity than the sum of the individual activities of the constituents.

Some specific methods of preparing my new compound, methenamine mandelate, are as follows:

Example 1.—14.0 grams methenamine and 15.2 grams dl-mandelic acid were dissolved in 30 cc. distilled water, filtered and evaporated in a vacuum at 40° C. to dryness. The resulting white crystalline powder is methenamine mandelate.

Example 2.—14.0 grams methenamine and 15.2 grams dl-mandelic acid were dissolved in 50 cc. hot methanol and boiled on a steam bath till it began to crystallize and then cooled in an ice bath. The crystals were collected on a filter, washed with ice cold methanol and dried.

Example 3.—14.0 grams methenamine and 15.2 grams dl-mandelic acid were dissolved in 50 cc. hot chloroform and boiled on the steam bath till it began to crystallize and then cooled in an ice bath. The crystals were collected on a filter, washed with ice cold chloroform and dried.

Example 4.—0.92 gram methenamine and 1.0 gram d-mandelic acid were dissolved in 10 cc. chloroform and evaporated on the steam bath till it began to crystallize and then cooled in an ice bath. The crystals were collected on a filter, and recrystallized from chloroform. M. P. 186–188° C. with decomposition.

Example 5.—1.42 grams methenamine and 1.5 grams l-mandelic acid were dissolved in 10 cc. methanol and evaporated on steam bath till it began to crystallize and then cooled in an ice bath. The crystals were collected on a filter and recrystallized from methanol. M. P. 217–219° C. with decomposition.

The product obtained by the methods described may be recrystallized from any of the above mentioned, or other suitable solvents.

As there is no appreciable difference in the bactericidal action of d- (dextro), l- (levo) or dl- (dextro-levo) mandelic acids, either of the optical isomers or the inactive mandelic acid will serve the same purpose. For technical reasons the dl-mandelate is the preferred compound.

As methenamine is monobasic, it combines with one molecule of mandelic acid. The white crystalline product formed by the described process, hexamethylentetramine mandelate has the following formula: $C_6H_{12}N_4 \cdot C_6H_5CH(OH)COOH$.

It is very soluble in water, alcohol, acetone, chloroform, slightly in cold, more in hot benzene, insoluble in ligroine. The melting point of methenamine dl-mandelate is 128–130° C.

The product shows a decided bactericidal action against cocci and bacilli, and the increase in action over both methenamine and mandelic acid is shown in the following table. The test was made by the agar plate method. Those plates which did not show any growth after forty-eight hours incubation were subcultured.

| Dilution | Methenamine | | Mandelic acid | | Methenamine Mandelate | |
|---|---|---|---|---|---|---|
| | S | C | S | C | S | C |
| 1:200 | 0— | + | 0— | 0— | 0— | 0— |
| 1:400 | + | + | 0— | 0— | 0— | 0— |
| 1:600 | + | + | 0— | + | 0— | 0+ |
| 1:800 | + | + | + | + | 0— | + |
| 1:1000 | + | + | + | + | 0— | + |
| 1:1500 | + | + | + | + | 0— | + |
| 1:2000 | + | + | + | + | + | + |
| Control | + | + | + | + | + | + |

S = Staphylococcus aureus
C = Escherichia coli
0 = no growth on plate
— = no growth in subculture
+ = growth This table clearly shows the improvement in bactericidal action. Considering the fact that methenamine mandelate contains only about 50% mandelic acid, the bactericidal action against Staphylococcus increased five times, against coli increased three times.

Methenamine mandelate is non-toxic and well tolerated when taken internally. It eliminates through the urinary tract, and exerts its bactericidal action in the kidneys and bladder, therefore it is a valuable therapeutic agent.

What I claim is:

1. As a new medicinal product, a methenamine mandelate, obtained by dissolving methenamine and a mandelic acid in a non-reacting solvent and evaporating the solution in vacuum.

2. As a new medicinal product, a substantially white crystalline product obtained by the reaction of a mandelic acid on methenamine in a suitable non-reacting solvent.

3. As a new medicinal substance, a methenamine mandelate, with the property of liberating formaldehyde in the urinary tract and so exert an antiseptic action.

4. As a new medicinal product, a white crystalline product which is hexamethylenetetramine mandelate.

5. As a new medicinal product, a reaction product of methenamine and a mandelic acid having increased relative bactericidal action over either mandelic acid or methenamine or the sum of both their actions.

6. The method of producing methenamine mandelate comprising dissolving methenamine and a mandelic acid in a non-reacting solvent and evaporating to crystal formation.

7. The method of producing a medicinal product comprising dissolving methenamine and a mandelic acid in hot methanol, boiling the solution to crystallization, cooling in an ice bath, and collecting the white crystals thus formed.

8. The method of producing a medicinal product comprising dissolving methenamine and a mandelic acid in hot chloroform, boiling the solution until crystallization commences, cooling and collecting the white crystals thus formed.

9. As a new medicinal product, a compound having the formula $C_6H_{12}N_4 \cdot C_6H_5CH(OC)HOOH$ and a melting point of 128–130° C.

10. As a new compound, a stable, non-hygroscopic, white, crystalline, hexamethylenetetramine salt of mandelic acid.

11. As a new compound, substantially pure, stable, non-hygroscopic, white, crystalline, cyclic-substituted-ammonium salts of mandelic acid.

EDMOND T. TISZA.